(12) United States Patent
Metzger et al.

(10) Patent No.: US 8,800,345 B2
(45) Date of Patent: Aug. 12, 2014

(54) LOAD CARRIER

(75) Inventors: Andreas Metzger, Männedorf (CH); Peter Schilling, Siebnen (CH); Stephan Baltisberger, Gossau (CH); Hans-Rudolf Burkhard, Wila (CH)

(73) Assignee: Mettler-Toledo AG, Greifensee (CH)

( * ) Notice: Subject to any disclaimer, the term of this patent is extended or adjusted under 35 U.S.C. 154(b) by 655 days.

(21) Appl. No.: 13/158,105

(22) Filed: Jun. 10, 2011

(65) Prior Publication Data

US 2011/0296899 A1    Dec. 8, 2011

Related U.S. Application Data

(63) Continuation of application No. PCT/EP2009/067112, filed on Dec. 14, 2009.

(51) Int. Cl.
*G01G 23/01* (2006.01)

(52) U.S. Cl.
USPC .............................. 73/1.13; 141/83; 177/253

(58) Field of Classification Search
CPC ........ G01G 21/22; G01G 21/26; G01G 23/00
USPC ................. 73/1.13; 141/83; 177/253
See application file for complete search history.

(56) References Cited

U.S. PATENT DOCUMENTS

| | | | | |
|---|---|---|---|---|
| 4,966,241 | A * | 10/1990 | Luchinger et al. | ............ 177/253 |
| 6,557,391 | B2 * | 5/2003 | Luchinger | ...................... 73/1.13 |
| 6,784,380 | B2 | 8/2004 | Weber et al. | |
| 6,835,901 | B2 * | 12/2004 | Luchinger | ..................... 177/253 |
| 6,864,438 | B2 | 3/2005 | Weber | |
| 7,250,577 | B2 | 7/2007 | Schilling et al. | |
| 2002/0038567 | A1 * | 4/2002 | Luchinger | ...................... 73/1.13 |

FOREIGN PATENT DOCUMENTS

| | | | | |
|---|---|---|---|---|
| CH | 0371210 | B1 * | 5/1993 | ............ G01G 21/22 |
| DE | 8801055.4 | U1 | 7/1988 | |
| DE | 10159418 | A1 * | 6/2002 | ............ G01G 21/22 |
| DE | 202008012406 | U1 | 12/2008 | |
| EP | 0271644 | B1 | 6/1988 | |
| JP | 3-218420 | A | 9/1991 | |
| JP | 2001-215145 | A | 8/2001 | |

* cited by examiner

*Primary Examiner* — Hezron E Williams
*Assistant Examiner* — Nathaniel Kolb
(74) *Attorney, Agent, or Firm* — Standley Law Group LLP

(57) ABSTRACT

A load carrier with a receiving pan for a free-flowing substance, a calibration weight holder for supporting a calibration weight, and a connector element for connecting the load carrier to a load receiver of a weighing cell. The receiving pan is arranged between the connector element and the calibration weight holder and is designed to be loaded with the free-flowing substance through a passage in the calibration weight holder. The calibration weight holder can be loaded with a calibration weight independently of the load status of the receiving pan.

14 Claims, 3 Drawing Sheets ns is incorporated by reference as if fully recited herein.

LOAD CARRIER

CROSS-REFERENCE TO RELATED APPLICATIONS

This application is a continuation under 35 USC §120 of PCT/EP2009/067112, filed 14 Dec. 2009 which is, in turn, entitled to and claims benefit of a right of priority under 35 USC §119 from German patent application 102008062144.7, filed on 16 Dec. 2008. The content of each of these applications is incorporated by reference as if fully recited herein.

TECHNICAL FIELD

The invention relates to a load carrier with a calibration weight holder and a receiving pan, and also to a method for calibrating a weighing cell that is equipped with the load carrier.

BACKGROUND

Weighing cells, particularly of the kind used in electronic balances, can be calibrated in different ways. The balance is in many cases equipped with an internal calibration weight which can be coupled to the force-transmitting mechanism of the weighing cell through a suitable linkage. An internal calibration weight is normally used only to perform calibrations. In the normal measuring mode, the internal calibration weight has no contact with the force-transmitting mechanism.

As another possibility, separate or external calibration weights can be used which are placed on the load carrier of the weighing cell. The placement of the calibration weights should be reproducible and very precise, so as to ensure that all calibrations take place under comparable conditions. External calibration weights are used for example for weighing cells that are specially designed to save space, so that there is no room for a calibration weight inside the balance housing, or for weighing cells of particularly rugged construction for use in harsh environments, because an internal calibration weight could not be moved with the necessary precision under such conditions.

With external calibration weights, it is also possible to perform multipoint calibrations using a set of calibration weights. A calibration weight set consists of a plurality of certified calibration weights which are weighed in sequence one after another.

To prevent a change of the mass of calibration weights over time, they should be stored in a way that minimizes any accumulation of dirt or dust on them. Also, calibration weights should always be picked up and held with suitable utensils such as tweezers, gloves, or a robot, so that for example no skin grease or other contamination can be transferred to the calibration weight by the user, which would cause a change in the mass of the calibration weight. These measures should be observed all the more strictly the smaller the mass of the calibration weight is that is being used.

The measures just described are relatively easy to implement for weighing cells which are used in a stand-alone balance. However, in situations where compact weighing cells are used either individually or in large numbers, for example as a weighing cell array in a process system or plant, it gets difficult to use external calibration weights, on the one hand because space is limited, and on the other hand the conditions for storing and using the calibration weights are not always optimal. Furthermore, an individual weighing cell and/or the load carrier belonging to it can be removed from the weighing cell array only through a laborious process. If the weighing cell is used to measure not only discrete solid objects but also free-flowing substances, the load carrier, in the process of being filled, can become contaminated, and the contamination can be transferred, in turn, to a calibration weight that is used for example to verify the calibration of the weighing cell.

Thus, the object of the invention lies in developing a device whereby a weighing cell can always be calibrated easily, quickly and with high precision with an external calibration weight.

SUMMARY OF THE GENERAL INVENTIVE CONCEPT

This object is solved by a load carrier with a receiving pan for a free-flowing substance, with a calibration weight holder for a calibration weight, and with a connector element for the connection to a load receiver of a weighing cell. The receiving pan is arranged between the connector element and the calibration weight holder and is designed to be loaded with the free-flowing substance through a passage in the calibration weight holder. The calibration weight holder can, in addition, be loaded with a calibration weight, independent of the load status of the receiving pan.

A load carrier with these attributes is very advantageous, as the calibration weight can be set on the calibration weight holder under reproducible conditions and without the risk that the calibration weight or the holder could become contaminated by the free-flowing substance. This is particularly advantageous, because contamination or fouling would change the mass of the calibration weight and lead to an incorrect calibration. The term "free-flowing substance" as used herein includes liquids as well as free-flowing solids such as powders and the like. A load carrier of this kind makes it possible to perform a calibration regardless of the load status of the receiving pan, or to verify a calibration under the given conditions.

The calibration weight holder and the bottom of the receiving pan are preferably arranged at a vertical distance from each other, so that the calibration weight can be set on the calibration weight holder even if the receiving pan is filled. This is particularly advantageous with a fixed installation of the weighing cell in a process system or plant, as it would be impossible to uninstall the weighing cell and/or to completely clean and dry the receiving pan for every calibration and or verification of the calibration. The design of the calibration weight holder makes it possible to load the receiving pan without contaminating the calibration weight holder, so that a calibration can take place under reproducible conditions and without contaminating the calibration weight.

Besides calibration weights, it is obviously also possible to place other solid bodies on the calibration weight holder and weigh them, if the load carrier is in force-transmitting contact with a weighing cell.

The receiving pan includes at least one seat for the calibration weight holder, which is conducive to a very compact design of the load carrier.

The seat for the calibration weight holder can be configured for example as a circumferential rim profile of the receiving pan.

In a further embodiment, the seat for the calibration weight holder can have the form of at least one recess in the receiving pan, arranged preferably at the upper edge of the receiving pan, so that the calibration weight holder can simply be set into, or seated on, the at least one recess.

The calibration weight carrier can for example have at least three supports onto which a calibration weight can be seated so that it is supported in at least three points. A three-point support represents a stable and reproducible seat for a calibration weight.

The calibration weight holder in a further embodiment is configured as a grid and releasably connected to the receiving pan. With this design, it is possible to use for example different types of grids for different calibration weights which have, for example, in most cases different diameters or different shapes. In addition, the releasable connection allows the calibration weight holder to be cleaned without uninstalling the receiving pan.

The calibration weight holder and the receiving pan can be permanently connected to each other or they can be designed in one piece as an integral unit. Load carriers of this type are particularly stable and rugged, so that they are particularly well suited for use in a process system or plant.

Preferably, the interior of the receiving pan as well as the calibration weight holder are designed to be substantially free of corners and edges, so that residues of the free-flowing substance cannot attach themselves and the load carrier is easy to clean. This is especially advantageous for applications that are subject to hygienic requirements.

The calibration weight holder can further include at least one centering element which serves to center the calibration weight relative to the load receiver of the weighing cell. In addition, the at least one centering element allows the calibration weight to be placed in a reproducible position on the calibration weight holder and serves to reduce eccentric loading errors in the calibration or weighing process.

In a further embodiment, the calibration weight and the calibration weight holder each comprise a means of mutual engagement, so that the calibration weight can be placed safely and reproducibly on the holder and in addition has more stability. The means of mutual engagement can be realized for example through the shape of the calibration weight and/or the calibration weight holder.

The loading of the calibration weight holder can be manual or automated, for example with a robot, so that the calibration and/or the verification of an existing calibration of a weighing cell can be integrated into an automated process sequence and performed automatically. It is likewise possible to put the calibration weight on manually, which is of advantage especially for calibrating an individual weighing cell or for an initial calibration or pre-calibration.

In order to use a load carrier according to the invention with a weighing cell, the load carrier is first connected to the load receiver of the weighing cell. Next, the calibration weight holder is loaded with a calibration weight, the weighing cell is calibrated, and subsequently the calibration weight is removed again. The receiving pan of the calibrated weighing cell can now be loaded with a first batch of a free-flowing substance which can be weighed.

The first batch of the free-flowing substance can now be at least partially removed again and can for example be used for another calibration process, the receiving pan can be loaded with a further batch of the free-flowing substance, and the weight of the batch that is present in the receiving pan can be determined. Alternatively, the first batch of the free-flowing substance can remain in the receiving pan, the calibration weight holder can be loaded again with the calibration weight, and the weighing cell can be calibrated, whereupon it can be removed again. Prior to each new weighing of the calibration weight and/or of a batch of the free-flowing substance, the weighing cell should be set to zero or tared, so that substance residues remaining in the weighing pan will not influence the weighing. The receiving pan can be loaded with the free-flowing substance through a passage in the calibration weight holder, and the latter can be loaded with the calibration weight independently of the loading status of the receiving pan. This represents a particular advantage, because it opens the possibility to perform or verify a calibration of the weighing cell also if the receiving pan has not been totally emptied, or even with a filled receiving pan, so that for example if the calibration is to be verified during operation of a process system or plant, it will not be necessary to completely remove residual substance. Particularly in a process system or plant, the receiving pan can be taken out and/or cleaned only during an interruption of the process, which should be avoided if at all possible.

Furthermore, the weighing cell can be calibrated for example at predetermined times or after certain time intervals without uninstalling the load carrier. In a process system or plant this can, among other benefits, lead to a strong reduction of the change-over times.

The calibration of the weighing cell and in particular the operations of moving the calibration weight on and off the load carrier can preferably be automated, but manual loading is also possible.

BRIEF DESCRIPTION OF THE DRAWINGS

The invention will hereinafter be explained through an example of an embodiment that is illustrated in the drawings, wherein like reference numerals across the several views refer to identical or equivalent features, and wherein.

DETAILED DESCRIPTION OF EXEMPLARY EMBODIMENT(S)

Figure 1:
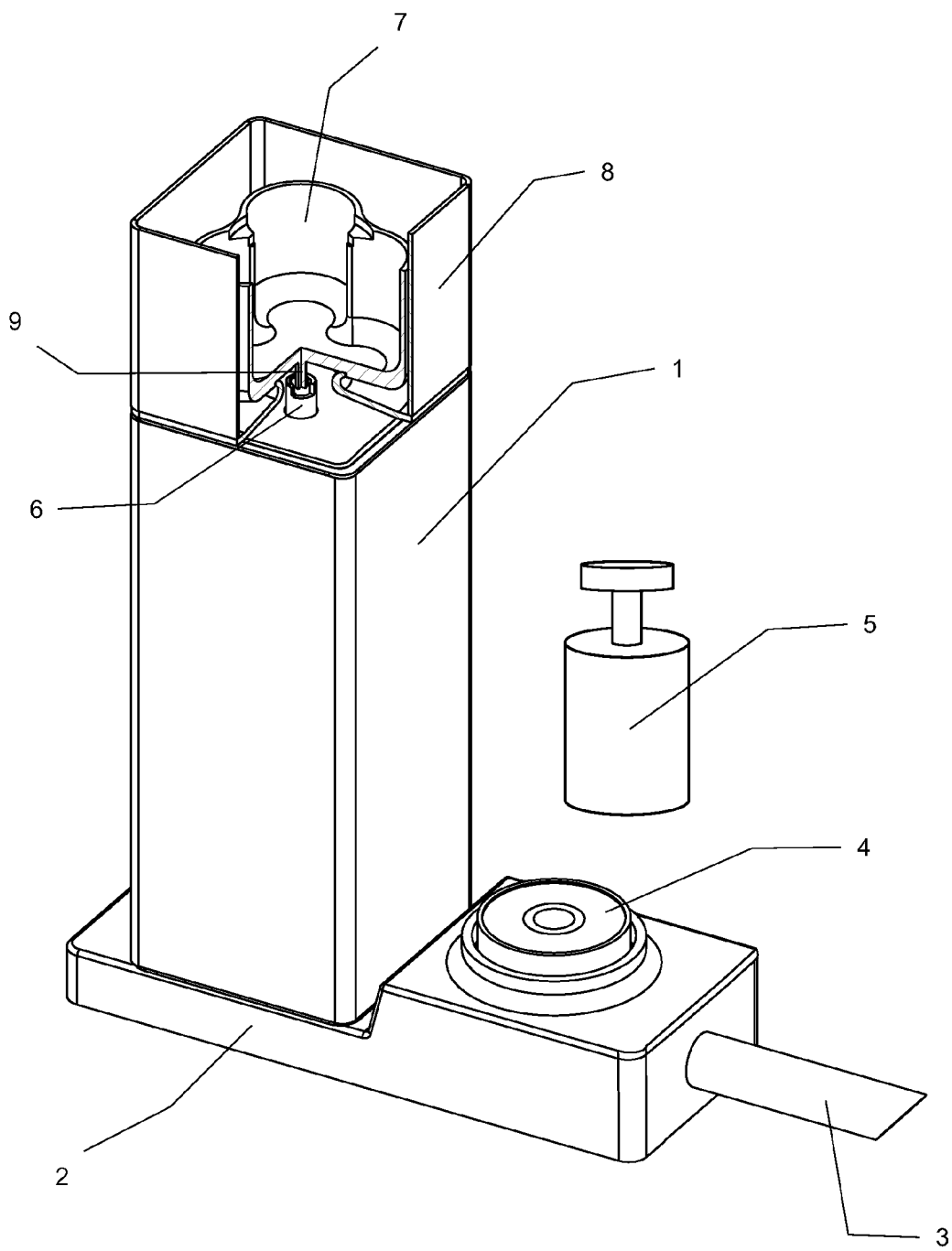
FIG. 1 shows a weighing cell for a weighing cell array with a load carrier according to the invention and a seat for a calibration weight, wherein the load carrier is shown partially in a cutaway view.

FIG. 1 shows a compact weighing cell 1 which can be arranged for example in an array consisting of a plurality of weighing cells. The weighing cell 1 comprises a support base 2 which comprises among other features a connection 3 for the control of the weighing cell 1. On the support base 2, next to the weighing cell 1, a storing place 4 for a calibration weight 5 is formed where the calibration weight 5 can be placed when no calibration is being performed. In addition, a spirit level can be incorporated in the storing place 4, which serves to check the alignment of the weighing cell.

On the weighing cell 1 a load receiver 6 can be seen which is connected to a force-transmitting mechanism arranged inside the weighing cell 1. A load carrier 7 is connected to the free end of the load receiver 6 by way of a peg-like connector element 9. In addition, the load carrier 7 is surrounded by a draft shield 8 which is connected to the weighing cell 1. The draft shield 8 preferably has a releasable connection to the weighing cell 1, so that the weighing cell 1 can be used with or without the draft shield 8, depending on requirements.

Figure 2:
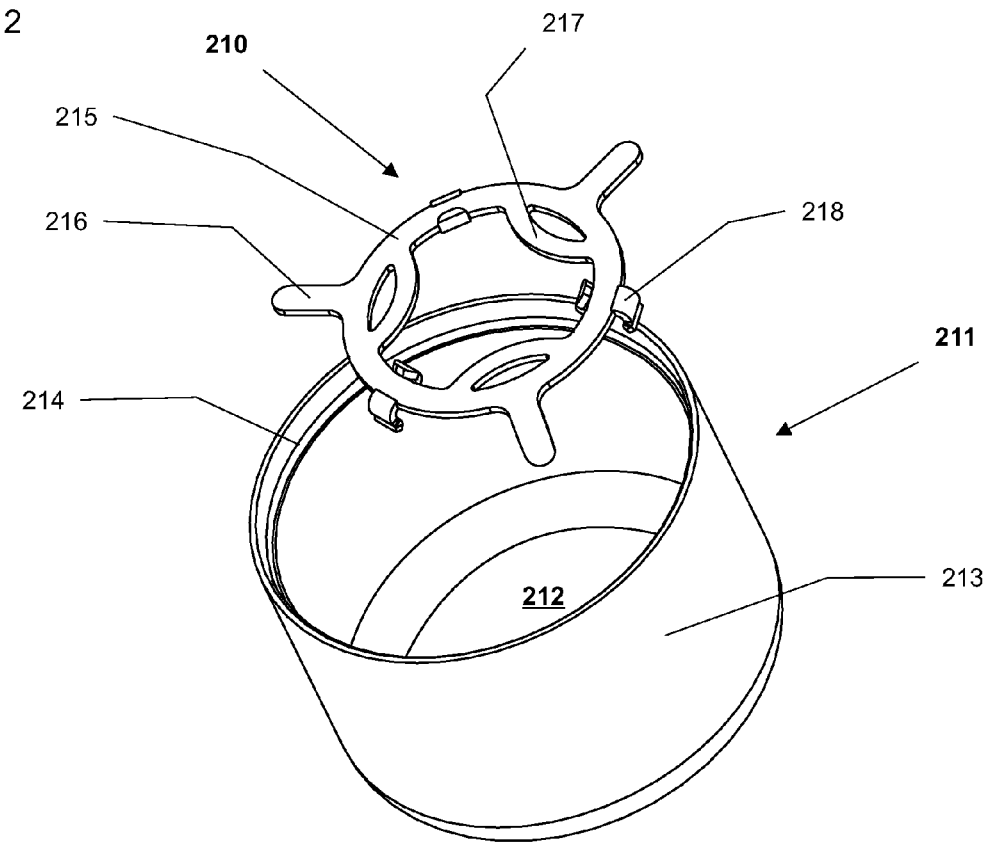
FIG. 2 shows a load carrier with a removable, grid-like calibration weight holder.
Figure 3:
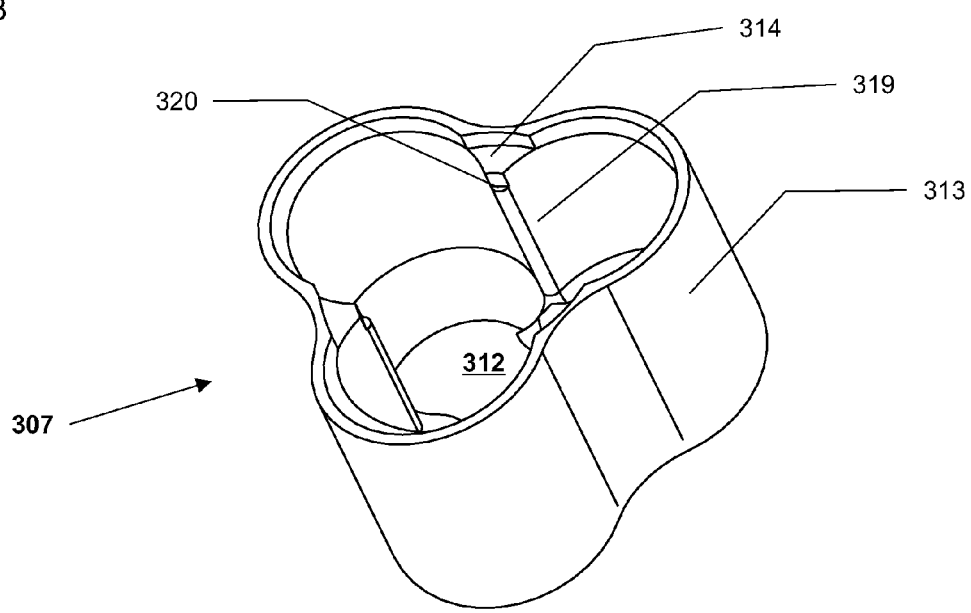
FIG. 3 shows a load carrier with a calibration weight holder configured as a rim profile of a receiving pan.
Figure 4:
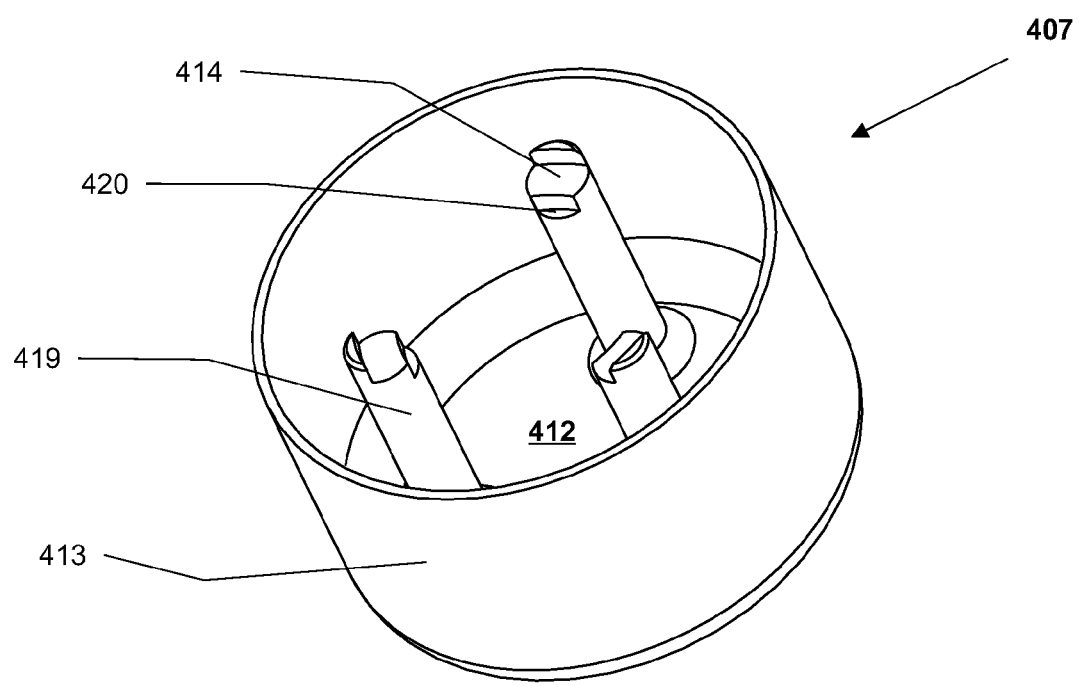
FIG. 4 shows a load carrier with a calibration weight holder having three supports.

Different configurations of the load carrier are shown in FIGS. 2 to 4 and will be explained in the following.

FIG. 2 shows a two-part load carrier with a grid-like calibration weight holder 210 and a receiving pan 211. The receiving pan 211 has a bottom 212 and a circumference wall 213 connected to the bottom 212. The bottom 212 of the load carrier in this example is of a substantially circular shape, but other geometrical designs are obviously also possible.

The free end of the wall 213 in this embodiment has a circumferential rim profile including an internal step 214 which serves as a seat for the calibration weight holder 210. As an alternative, the rim can also have indentations in which the calibration weight holder can be engaged.

The calibration weight holder 210 is in essence a flat ring 215 with three lugs 216 which are arranged on the outside of the ring 215 and are evenly distributed along the outside circumference of the ring 215. With these lugs 216, the calibration weight holder 210 can be positioned on the step 214 of the receiving pan 211. In addition, the step 214 can also have a recess, so that the lugs 216 can engage the recess, whereby a stable connection is established. The ring 215 further has widened areas 217 at several locations, three in this example, which are configured as arc-shaped connectors as a way to reduce the added weight. The calibration weight (see FIG. 1) can be set on the ring 215 when the latter is resting on the receiving pan 211. To perform a calibration, the load carrier should have been connected first to the load receiver of a weighing cell.

To stabilize and secure the calibration weight, the ring 215 can be equipped with one or more centering elements 218. The centering elements 218 are in this case configured in such a way that they can be used for calibration weights of larger diameter on one side of the ring 215, and for weights of smaller diameter when the ring 215 is turned over. The choice depends on which side of the calibration holder 210 is facing upward, i.e. towards the calibration weight. In addition, the centering elements delimit the area where the calibration weight can be placed.

Instead of the circumferential rim profile, the load carrier can also have at least three indentations or recesses which can be engaged by the lugs 216 of the calibration weight holder 210, or three individual seats on which the lugs 216 of the calibration weight holder 210 can be set.

The ring 215 has a central opening which makes it possible to fill or load the receiving pan 211 also when the calibration weight holder 210 is in place. In the assembled state, the wall 213 dictates the vertical distance of the calibration weight holder 210 from the bottom 212 of the receiving pan 211, and a calibration weight can therefore by set on the calibration weight holder 210 even if the receiving pan is 211 is filled, without the risk that the calibration weight could come into contact with a substance that is present in the receiving pan 211. This is of particular advantage if the weighing cell is permanently installed in a process system or plant, where it is not feasible to uninstall the weighing cell and/or completely clean and dry the receiving pan 211 every time the weighing cell needs to be calibrated or the calibration needs to be verified.

The calibration weight holder 210 allows the receiving pan 211 to be loaded without the calibration weight holder 210 becoming contaminated, so that a calibration can take place under replicable conditions and without contaminating the calibration weight.

FIG. 3 shows a further embodiment of a load carrier 307 according to the invention with a calibration weight holder integrally incorporated in the receiving pan. The receiving pan again has a bottom 312 and a circumferential wall 313. This load carrier 307 works in substantially the same way as described in the context of FIG. 2.

To reduce the weight and at the same time provide as large a volume as possible, the bottom 312 of the receiving pan is shaped essentially like three circles overlapping each other in the middle. The bottom 312 is connected to the wall 313, with the latter being reinforced or thickened at the intersections of the circles, so that support columns 319 are formed at these locations. At the opposite ends from the bottom 312, each of the support columns 319 has at least one step 314, 320. These steps 314, 320 simultaneously constitute the calibration weight holder and serve as a seat for the calibration weight (see FIG. 1).

So that calibration weights with different-sized footprints, representing in most cases different masses, can be used for the calibration of a weighing cell without exchanging the load carrier 307, the support columns 319 have several steps 314, 320 of different radial depth towards the interior of the receiving pan.

Like the load carrier illustrated in FIG. 1, the receiving pan of this load carrier 307 can also be loaded through the passage that is formed between the support columns 319, so that a reproducible calibration can be assured.

The load carrier 407 shown in FIG. 4 has an essentially circular-shaped bottom 412 and a circumferential wall 413 forming the receiving pan. Arranged in the receiving pan are at least three free-standing pillar-like supports 419 whose one end is fastened to the bottom 412. The supports 419 are in this case approximately as tall as the wall 413, but can of course also be taller or shorter than the wall 413. The free ends of the supports 419 again have several steps 414, 420 of different depths towards the interior of the receiving pan. The respective sets of steps 414, 420 lying in the same horizontal plane serve as seats for calibration weights of different sizes which can be set on the steps 414, 420 sharing the same respective plane without the risk of contamination.

The supports 419 are arranged in such a way that they leave a clear passage in the center through which the receiving pan can be loaded without contaminating the steps 414, 420 of the supports 419.

The load carriers shown in FIGS. 2 to 4 preferably have rounded internal surfaces in order to facilitate the cleaning of the load carriers and to minimize or completely avoid the problem of substance residues clinging to the receiving pan. The load carriers shown here further have a rounded and/or circular shape on the outside, but a load carrier according to the invention can obviously also have other shapes on the outside, such as oval or angular.

To provide a stable seat of the calibration weight, a calibration weight holder according to the invention has at least three points of support for a calibration weight.

The load carriers according to the invention can be used with different weighing cells. The use in combination with the weighing cell of FIG. 1 is shown only as an example. In addition, load carriers in which the features shown in FIGS. 2 to 4 are used in a different combination are likewise counted among load carriers according to the present invention.

LIST OF REFERENCE SYMBOLS 1 weighing cell
2 support base
3 connection
4 storing place
5 calibration weight
6 load receiver
7, 307, 407 load carrier
8 draft shield
9 connector element
210 calibration weight holder
211 receiving pan 212, 312, 412 bottom
213, 313, 413 wall
214, 314, 414 step
215 ring
216 lug
217 widened area
218 centering element
319, 419 support, support column
320, 420 step While certain embodiments of the present invention are described in detail above, the scope of the invention is not to be considered limited by such disclosure, and modifications are possible without departing from the spirit of the invention as evidenced by the following claims:

What is claimed is:

1. A load carrier for a weighing cell, comprising:
 a connector element for connecting the load carrier to a weighing cell;
 a calibration weight holder for supporting a calibration weight, the calibration weight holder having a passage therethrough; and
 a receiving pan designed for loading with a free-flowing substance through the passage in the calibration weight holder, said receiving pan arranged between the calibration weight holder and the connector element;
 wherein the calibration weight holder can be loaded with a calibration weight regardless of the load status of the receiving pan.

2. A load carrier according to claim 1, wherein the receiving pan includes at least one seat for the calibration weight holder.

3. A load carrier according to claim 2, wherein the seat is formed by a circumferential rim profile of the receiving pan.

4. A load carrier according to claim 2, wherein the seat is formed by at least one recess in the rim at the top of the receiving pan.

5. A load carrier according to claim 1, wherein the calibration weight holder includes at least three supports.

6. A load carrier according to claim 1, wherein the calibration weight holder is configured substantially as a ring and is releasably connected to the receiving pan.

7. A load carrier according to claim 1, wherein the calibration weight holder and the receiving pan are rigidly connected to each other or formed integrally of one piece.

8. A load carrier according to claim 1, wherein the calibration weight holder includes at least one centering element.

9. A load carrier according to claim 1, wherein the calibration weight and the calibration weight holder each include at least one means of engagement, the respective means of engagement cooperating with each other.

10. A load carrier according to claim 1, wherein the interior of the receiving pan and the calibration weight holder have rounded interior surfaces.

11. A load carrier according to claim 1, wherein the calibration weight holder can be loaded manually.

12. A load carrier according to claim 1, wherein the calibration weight holder can be loaded automatically.

13. A method of calibrating a weighing cell and weighing a free-flowing substance, comprising:
 (a) connecting a load carrier to a load receiver of the weighing cell, the load carrier including a receiving pan designed for loading with a free-flowing substance and a calibration weight holder having a passage through which the receiving pan may be loaded with the free-flowing substance;
 (b) loading the calibration weight holder with a calibration weight, calibrating the weighing cell, and subsequently removing the calibration weight;
 (c) loading the receiving pan with a batch of the free-flowing substance and measuring the weight of the free-flowing substance residing in the receiving pan;
 (d) removing at least part of the of the free-flowing substance from the receiving pan; and
 (e) repeating steps (c)-(d) with or without first repeating step (b);
 wherein, the calibration weight holder can be loaded with the calibration weight independently of the load status of the receiving pan.

14. A method according to claim 13, wherein the loading of the calibration weight holder or of the receiving pan is automated.

* * * * *

UNITED STATES PATENT AND TRADEMARK OFFICE
CERTIFICATE OF CORRECTION

| | | |
|---|---|---|
| PATENT NO. | : 8,800,345 B2 | Page 1 of 1 |
| APPLICATION NO. | : 13/158105 | |
| DATED | : August 12, 2014 | |
| INVENTOR(S) | : Metzger et al. | |

It is certified that error appears in the above-identified patent and that said Letters Patent is hereby corrected as shown below:

On the title page, Item [30] insert -- Dec. 16, 2008 (DE) 102008062144.7 --.

On the title page, Item [56] delete "CH 0371210 B1 * 5/1993 .......... G01G 21/22" and insert -- EP 0371210 B1 * 5/1993 .......... G01G 21/22 --.

Signed and Sealed this
Twenty-first Day of October, 2014

Michelle K. Lee
*Deputy Director of the United States Patent and Trademark Office*